(12) United States Patent
Kawashima et al.

(10) Patent No.: US 9,756,516 B2
(45) Date of Patent: Sep. 5, 2017

(54) COMMUNICATION APPARATUS AND ESTIMATION METHOD

(71) Applicant: FUJITSU LIMITED, Kawasaki-shi, Kanagawa (JP)

(72) Inventors: Shinichi Kawashima, Ebina (JP); Norio Murakami, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 120 days.

(21) Appl. No.: 14/937,856

(22) Filed: Nov. 10, 2015

(65) Prior Publication Data

US 2016/0156534 A1 Jun. 2, 2016

(30) Foreign Application Priority Data

Dec. 1, 2014 (JP) ................. 2014-243170

(51) Int. Cl.
*H04W 24/08* (2009.01)
*H04B 7/155* (2006.01)
*H04L 12/26* (2006.01)

(52) U.S. Cl.
CPC ........ *H04W 24/08* (2013.01); *H04B 7/15528* (2013.01); *H04L 43/0829* (2013.01)

(58) Field of Classification Search
CPC . H04W 24/08; H04B 7/15528; H04L 43/0829
See application file for complete search history.

(56) References Cited

U.S. PATENT DOCUMENTS

| | | | |
|---|---|---|---|
| 2005/0117643 A1* | 6/2005 | Hatabu | H04N 21/25808 375/240.12 |
| 2005/0226325 A1* | 10/2005 | Dei | H04N 19/61 375/240.12 |
| 2007/0177502 A1 | 8/2007 | Hama | |
| 2016/0112515 A1* | 4/2016 | Ohara | H04L 67/38 709/203 |

FOREIGN PATENT DOCUMENTS

| | | |
|---|---|---|
| JP | 2007-208571 A | 8/2007 |
| JP | 2012-186772 A | 9/2012 |

* cited by examiner

*Primary Examiner* — Jianye Wu
(74) *Attorney, Agent, or Firm* — Arent Fox LLP

(57) ABSTRACT

According to an aspect of the invention, a communication apparatus that relays a plurality of image frame data, each of which includes at least one packet, between a host apparatus and a terminal apparatus, the communication apparatus includes a memory and processor coupled to the memory and configured to receive the plurality of image frame data transmitted at a transmission intervals from the host apparatus, measures a reception interval between the plurality of image frame data, and estimate, based on a difference value between the reception interval and the transmission interval, a reception time range within which packet loss occurs in the received plurality of image frame data.

16 Claims, 12 Drawing Sheets

COMMUNICATION APPARATUS AND ESTIMATION METHOD

CROSS-REFERENCE TO RELATED APPLICATION

This application is based upon and claims the benefit of priority of the prior Japanese Patent Application No. 2014-243170, filed on Dec. 1, 2014, the entire contents of which are incorporated herein by reference.

FIELD

The present technology discussed herein is related to a communication apparatus and an estimation method.

BACKGROUND

A mobile communication system such as a portable telephone system or a wireless local area network (WLAN) is utilized widely at present. Further, in the field of mobile communication, ongoing discussions have been and are being conducted on the next generation communication technology in order to further improve the communication speed, communication capacity and communication quality. For example, by the 3rd generation partnership project (3GPP) that is a standardization organization, standardization of communication standards called long term evolution (LTE) or communication standards called LTE-advanced (LTE-A) based on LTE is completed or being investigated.

In a mobile communication system, maintenance or assurance of stabilized communication quality sometimes depends upon the situation of a user who utilizes the mobile communication system or the communication environment of a cell visited by a terminal apparatus.

For example, advanced medical equipment such as a computed tomography (CT) scanner is being incorporated into an ambulance or the like, and when a patient is transported to a hospital by such an ambulance, a large amount of information is sometimes transmitted to the hospital. However, in a transport process from the accident site to the hospital, the accident site may be crowded with onlookers, and therefore, when the ambulance moves, congestion of communication may occur.

Not only in the example of transportation by an ambulance, but also in various situations in viewing services of moving pictures or handling of big data, congestion of communication has come to occur together with explosive growth of smartphones and so forth. Congestion of communication sometimes causes, for example, packet loss, and increased time may be required until a normal packet reaches the reception side. Accordingly, congestion of communication makes maintenance and assurance of stabilized communication quality difficult.

Further, reservation and guarantee of a bandwidth by mass transmission of mass information, reservation and guarantee of a bandwidth by mass transmission upon handover, a mechanism for billing commensurate with the used bandwidth and so forth are demanded.

On the other hand, in the field of mobile communication, self-similarity of the traffic sometimes appears. For example, if a packet error or the like occurs, then a base station apparatus sometimes performs retransmission control such as, for example, automatic repeat request (ARQ) or hybrid ARQ (HARQ) to transmit a packet with which an error has occurred to a terminal apparatus again. In this case, even if the base station apparatus performs retransmission control, a packet error sometimes occurs again. The self-similarity signifies a situation in which, for example, when an error occurs in this manner, even if it is tried to recover the error, a same error occurs again and this is repeated.

In the field of mobile communication described above, for example, such technologies as described below are available.

In particular, a packet loss prediction apparatus is available wherein a delay fluctuation is calculated from a transmission interval and a reception interval of packets and, when the value of the delay fluctuation continues for a period longer than a first given length within a range of abnormal values, it is predicted that there is the possibility that packet loss may have occurred.

With this technology, it is considered that occurrence of packet loss can be predicted in real time communication.

Further, a communication system is available wherein light congestion or heavy congestion is detected at the communication terminal side, and even when light congestion is detected, a window for determining a packet transmission amount is increased and a lost packet is sent again.

With the technology just described, it is considered that the throughput can be increased even in a high loss rate state without a notification of special congestion information from a network. As related art documents, Japanese Laid-open Patent Publication No. 2012-186772 and Japanese Laid-open Patent Publication No. 2007-208571 are available.

SUMMARY

According to an aspect of the invention, a communication apparatus that relays a plurality of image frame data, each of which includes at least one packet, between a host apparatus and a terminal apparatus, the communication apparatus includes a memory and processor coupled to the memory and configured to receive the plurality of image frame data transmitted at a transmission intervals from the host apparatus, measures a reception interval between the plurality of image frame data, and estimate, based on a difference value between the reception interval and the transmission interval, a reception time range within which packet loss occurs in the received plurality of image frame data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The technology of calculating a value of a delay fluctuation described above predicts, for example, the possibility that loss of a packet may occur. However, the technology neither discloses nor suggests a countermeasure itself against packet loss or what countermeasure is to be selected although prediction of packet loss is performed.

In the technology that the window size is increased when light congestion is detected, although the countermeasure of re-sending of a packet is taken, re-sending of a packet may not necessarily be appropriate as a countermeasure. Further, the technology neither discloses nor suggests what countermeasure may be selected as a countermeasure other than re-sending of a packet.

If the countermeasure against packet loss is not appropriate, then packet loss continues, and, for example, a terminal apparatus may receive packet data after a delay of time from a scheduled point of time at which the packet data is to be received normally. Accordingly, where the countermeasure against packet loss is not appropriate, initially intended communication quality may not be maintained. In the following, embodiments are described.

First Embodiment

Figure 1:
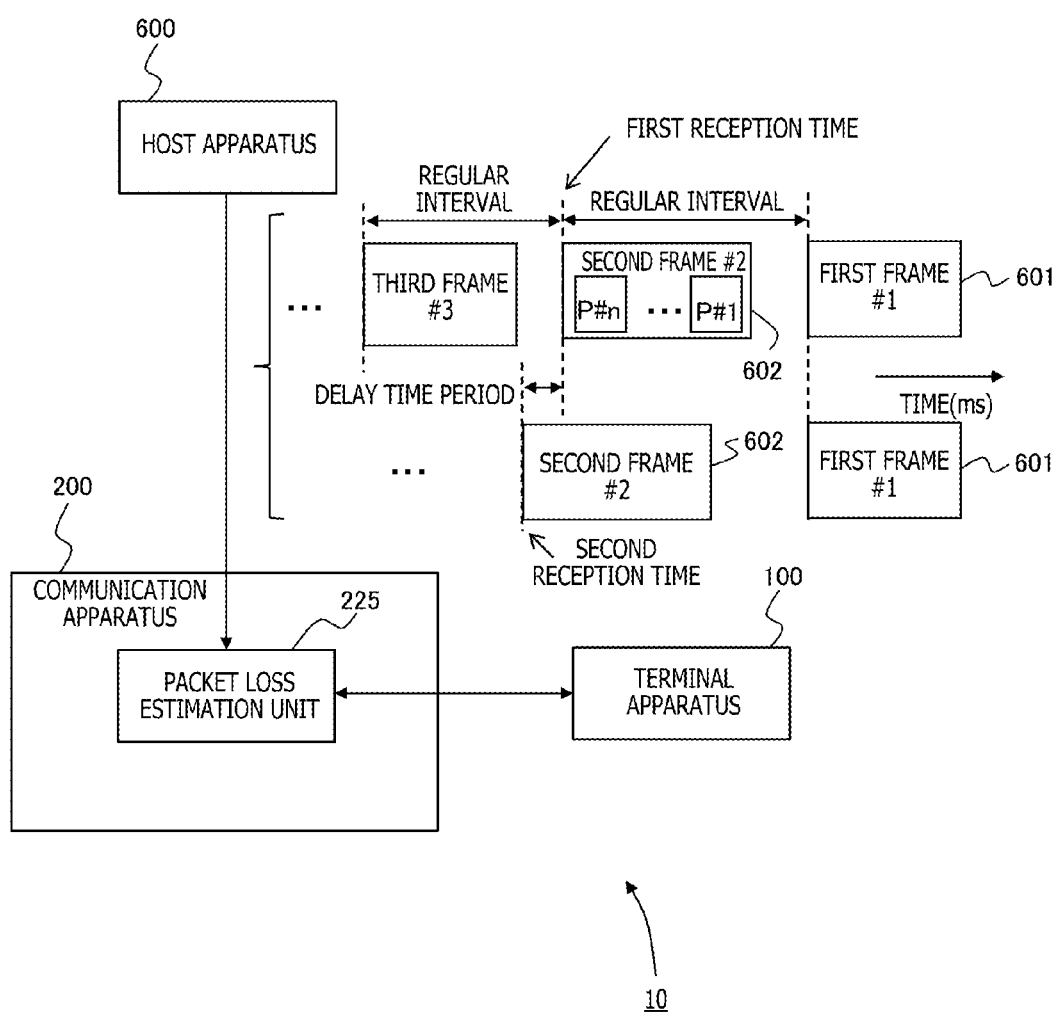
FIG. 1 is a block diagram depicting an example of a configuration of a communication system.

A first embodiment is described. FIG. 1 is a block diagram depicting an example of a configuration of a communication system according to the first embodiment.

A communication system 10 includes a terminal apparatus 100, a communication apparatus 200, and a host apparatus 600. The communication apparatus 200 includes a packet loss estimation unit 225.

The host apparatus 600 transmits image frame data at regular intervals to the communication apparatus 200. The image frame data include, for example, one or a plurality of packet data P#1, . . . , P#n (n is an integer equal to or greater than 1). In the example of FIG. 1, the host apparatus 600 transmits first image frame data 601 and second image frame data 602 at regular intervals.

Although the host apparatus 600 transmits image frame data at regular intervals, congestion of the network between the host apparatus 600 and the communication apparatus 200 may elongate the regular interval and the communication apparatus 200 may receive the image frame data at a point of time later than an initially scheduled point of time.

When the communication apparatus 200 receives image frame data at regular intervals, the reception time when the second image frame data 602 is received is referred to as first reception time. On the other hand, the reception time when the second image frame data 602 is received after a time period longer than the regular interval of time is referred to as second reception time.

The packet loss estimation unit 225 estimates a packet loss occurrence estimated segment indicative of a time period within which loss of the packet data P#1, . . . , P#n included in the image frame data is to continue on the basis of an increasing value (or fluctuation value) of the delay time period of the second reception time from the first reception time.

The communication apparatus 200 can take various countermeasures against packet loss, for example, on the basis of the packet loss occurrence estimated segment. In this case, the communication apparatus 200 can take an optimum countermeasure against packet loss because the packet loss occurrence estimated segment is calculated already in comparison with an alternative case in which it is estimated whether or not packet loss has occurred.

For example, the communication apparatus 200 can take different countermeasures such that it performs a countermeasure A when the packet loss occurrence estimated segment is longer than a given value but performs another countermeasure B when the packet loss occurrence estimated segment is equal to or shorter than the given value.

Accordingly, the communication apparatus 200 can perform an effective countermeasure against packet loss in response to the length of the packet loss occurrence estimated segment in comparison with an alternative case in which it is estimated whether or not packet loss has occurred. Consequently, for example, in the communication system 10, packet loss can be minimized, and the quality of packet data from the host apparatus 600 to the terminal apparatus 100 can be maintained.

The communication apparatus 200 may be, for example, a base station apparatus, an S-GW, a P-GW or the like.

Second Embodiment

<Example of Configuration of Communication System>

Figure 2:
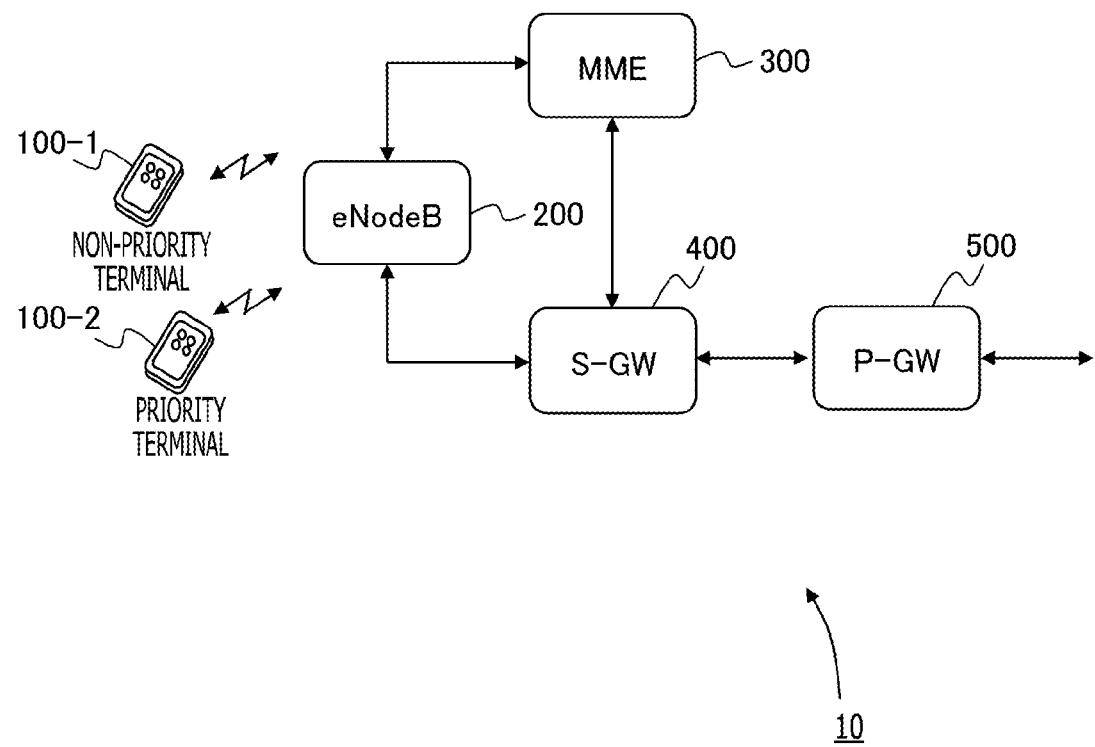
FIG. 2 is a block diagram depicting an example of a configuration of another communication system.

FIG. 2 is a block diagram depicting an example of a configuration of a communication system. A communication system 10 includes terminal apparatus (hereinafter referred to sometimes each as "terminal") 100-1 and 100-2, and an evolved node B (hereinafter referred to as eNodeB, base station apparatus or base station) 200. The communication system 10 further includes an MME 300, an S-GW 400, and a P-GW 500.

Each of the terminals 100-1 and 100-2 is a portable terminal apparatus such as, for example, a feature phone, a smartphone or a tablet. Alternatively, each of the terminals 100-1 and 100-2 may be a fixed terminal apparatus such as, for example, a smart meter. The terminals 100-1 and 100-2 can perform radio communication with the base station 200 in a service area of the base station 200 to enjoy various services such as a communication service or a Web page browsing service.

It is to be noted that the terminals 100-1 and 100-2 are classified into two types of terminals of the non-priority terminal 100-1 and the priority terminal 100-2.

The priority terminal 100-2 is a terminal apparatus incorporated in an emergency vehicle such as, for example, an ambulance or a police vehicle. Alternatively, the priority terminal 100-2 is a terminal apparatus that is used, for example, by a user who pays a more expensive fee than the fee paid for the non-priority terminal 100-1.

Meanwhile, the non-priority terminal 100-1 is a terminal apparatus used, for example, by a user who pays a regular fee or the like. The non-priority terminal 100-1 is sometimes low in priority degree in allocation of a radio resource in comparison with the priority terminal 100-2. The base station 200 minimizes congestion upon utilization of services by allocating a radio resource to the priority terminal 100-2 preferentially to the non-priority terminal 100-1 or by like means.

The base station 200 is an example of a communication apparatus, and extracts user data, a control signal and so forth from packet data transmitted thereto from the MME 300 or the S-GW 400 and converts the extracted user data and so forth into a radio signal. The base station 200 transmits the radio signal after the conversion to the terminal 100-1 or 100-2. Further, the base station 200 extracts user data, a control signal and so forth from a radio signal transmitted thereto from the terminal 100-1 or 100-2 and converts the extracted user data and so forth into packet data. The base station 200 transmits the packet data after the conversion to the MME 300 or the S-GW 400.

In the present second embodiment, the base station 200 estimates a duration of packet loss on the basis of an arriving delay time period of packet data exchanged, for example, from the MME 300 or the S-GW 400. An estimation method or the like will be described later. The base station 200 transmits the estimated packet loss duration to the P-GW 500 through the S-GW 400.

The MME 300 is a communication apparatus that performs, for example, position management and authentication management of the terminals 100-1 and 100-2, establishment or deletion of a bearer and so forth. The MME 300 can identify whether each of the terminals 100-1 and 100-2 is a priority terminal or a non-priority terminal, for example, on the basis of user identification (ID) or the like as identification information of a user, a telephone number of each of the terminals 100-1 and 100-2 and so forth.

The S-GW 400 is a communication apparatus that repeats packet data to be exchanged between the base station 200 and the P-GW 500. Further, the S-GW 400 performs, for example, when it receives packet data destined for the terminal 100-1 or 100-2 and having no radio bearer set therein from the P-GW 500, a setting request for a radio bearer to the MME 300. The S-GW 400 transmits the packet data toward the terminal 100-1 or 100-2 in accordance with the set radio bearer.

The P-GW 500 is a communication apparatus that manages, for example, user data of the terminals 100-1 and 100-2 and couples an external network and the communication system 10 to each other. Further, the P-GW 500 performs paying out (or allocation) of an Internet Protocol (IP) address to each of the terminals 100-1 and 100-2. Furthermore, if a packet loss duration is received from the base station 200, then the P-GW 500 performs admission control for packet data.

The admission control signifies to perform a decision regarding, for example, whether a communication band (or a bit rate) designated for communication between two parties between which communication is to be performed can be reserved. In the admission control, for example, a threshold value is changed, the threshold value restricting a data amount (or bandwidth) of packet data to be transmitted to or received from a terminal 100 by the base station 200, the S-GW 400, the P-GW 500 or the like. By the admission control, it is possible to secure a flow rate of packet data, for example, for a user in an emergency vehicle or a user who has paid an expensive fee but limits the flow rate of packet data for the other users.

As an example of the admission control, for example, congestion control by filtering of packet data or stream control transmission control (SCTP), allocation of radio resource and so forth are available. An example of the admission control is hereinafter described.

It is to be noted that the base station 200 and the MME 300, the S-GW 400 and the P-GW 500 are hereinafter referred to each as, for example, Evolved Packet Core (EPC).

In the following description, an example of a configuration of the base station 200, the MME 300, the S-GW 400 and the P-GW 500 included in the communication system 10 is described.

<Example of Configuration of Base Station Apparatus>

Figure 3:
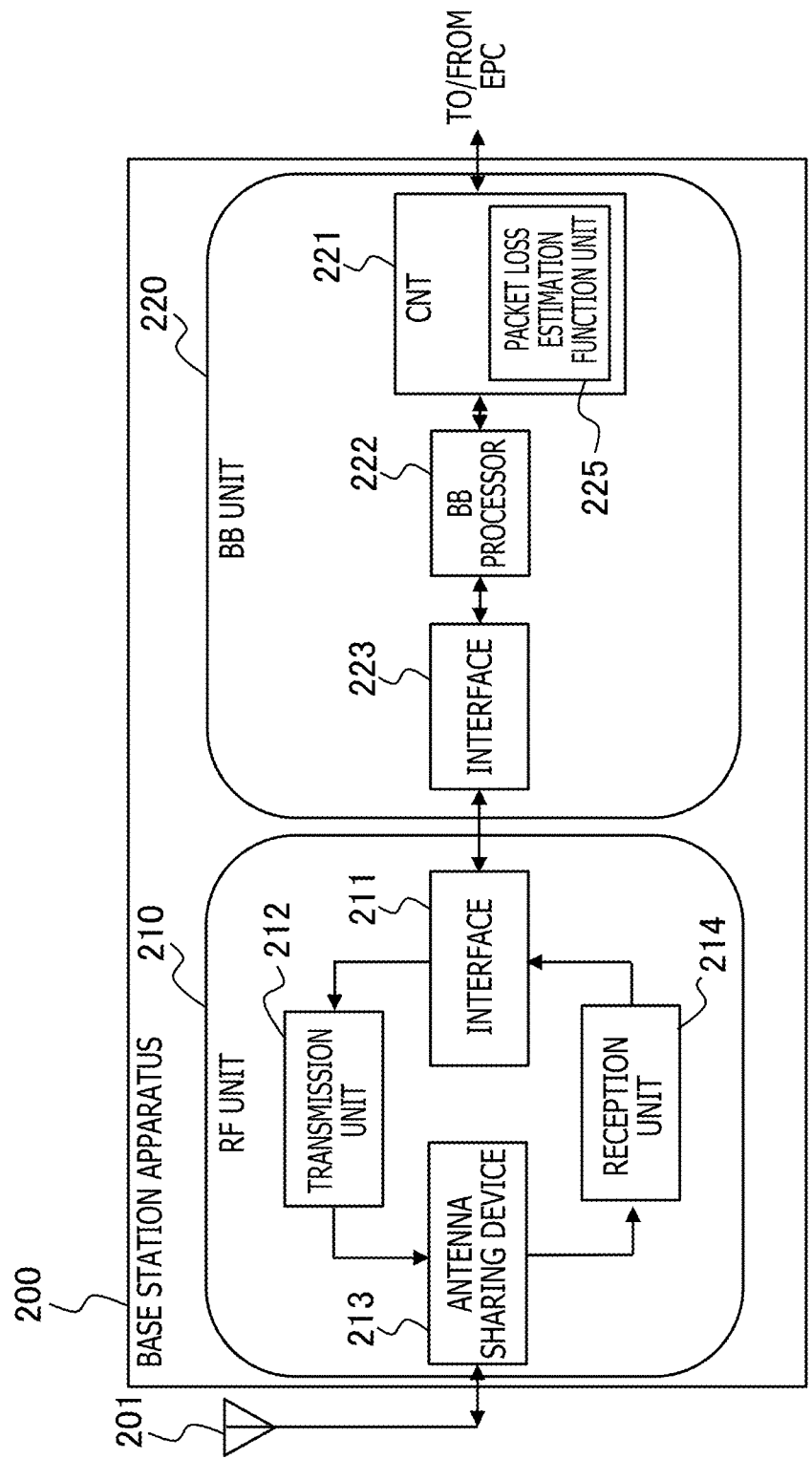
FIG. 3 is a block diagram depicting an example of a configuration of a base station apparatus.

FIG. 3 is a block diagram depicting an example of a configuration of the base station 200. The base station 200 includes an antenna 201, a radio frequency (RF) unit 210 and a baseband (BB) unit 220.

The antenna 201 receives a radio signal transmitted from the terminal 100-1 or 100-2 and outputs the received radio signal to the RF unit 210. Further, the antenna 201 transmits a radio signal outputted from the RF unit 210 to the terminal 100-1 or 100-2.

The RF unit 210 includes an interface 211, a transmission unit 212, an antenna sharing device 213, and a reception unit 214.

The interface 211 extracts a baseband signal from a signal of a given format (for example, an optical signal) outputted from the BB unit 220 and outputs the extracted baseband signal to the transmission unit 212. Further, the interface 211 converts a baseband signal outputted from the reception unit 214 into a signal of the given format and outputs the signal after the conversion to the BB unit 220.

The transmission unit 212 performs frequency conversion and so forth for a baseband signal outputted from the interface 211 to convert the baseband signal into a radio signal of a radio band and outputs the radio signal after the conversion to the antenna sharing device 213. The transmission unit 212 may include, for example, a frequency conversion circuit, a digital to analog (D/A) conversion circuit, a band-pass filter and so forth.

The antenna sharing device 213 outputs a radio signal outputted from the transmission unit 212 to the antenna 201 and outputs a radio signal received from the antenna 201 to the reception unit 214.

The reception unit 214 performs a frequency conversion process and so forth for a radio signal received from the antenna sharing device 213 to convert the radio signal into a baseband signal of a baseband and outputs the baseband signal after the conversion to the interface 211. The reception unit 214 may include, for example, an analog to digital (A/D) conversion circuit, a band-pass filter, a frequency conversion circuit and so forth.

The BB unit 220 includes a controller (CNT) 221, a BB processor 222 and an interface 223.

The CNT 221 receives packet data from the MME 300 or the S-GW 400 and extracts user data, a control signal and so forth from the packet data. The CNT 221 outputs the extracted user data to the BB processor 222. Further, the CNT 221 receives user data, a control signal and so forth from the BB processor 222 and converts the user data and so forth into packet data. The CNT 221 transmits the packet data after the conversion to the MME 300 or the S-GW 400. It is to be noted that, in the description of the present embodiment, it is described for simplified description that a call control process, for example, a process of a radio resource control (RRC) layer and a transmission and reception process of packet data to and from a core node apparatus, for example, the MME 300 or the S-GW 400 are executed by the CNT 221. However, the call control process and the packet data transmission and reception process to and from a core node apparatus may be executed by processing entities different from each other.

The CNT 221 performs management of radio resources with the terminals 100-1 and 100-2, selection of the MME 300, a paging process, generation of broadcast information and so forth to generate a control signal and so forth suitably. The CNT 221 transmits the generated control signal to the terminals 100-1 and 100-2 through the BB processor 222 or the like and transmits the control signal to the MME 300, the S-GW 400 or the like.

As the management of radio resources, for example, such a process as described below is performed. In particular, the CNT 221 performs scheduling and so forth relating to radio communication with the terminals 100-1 and 100-2 and generates a control signal including a result of the scheduling. The CNT 221 transmits the generated control signal to the terminals 100-1 and 100-2 through the BB processor 222 and so forth. The control signal includes allocation of a radio resource as the result of the scheduling and further includes a code rate of error correction coding, a modulation method and so forth. The base station 200 and the terminals 100-1 and 100-2 perform radio communication in accordance with the result of the scheduling.

The CNT 221 further includes a packet loss estimation unit 225. The packet loss estimation unit 225 receives packet data transmitted, for example, from the S-GW 400, measures the number of received reception data packets, an arriving interval of reception data packets and so forth and calculates an increase value of the delay time period of packet data. Then, the packet loss estimation unit 225 determines the calculated increase value of the delay time period as "delay fluctuation" and estimates a packet loss duration on the basis of the "delay fluctuation." The CNT 221 receives the packet loss duration from the packet loss estimation unit 225 and transmits the received packet loss duration to the P-GW 500. The CNT 221 itself may perform a process relating to admission control on the basis of the packet loss duration. As an example of such a process as just described, for example, allocation change of a radio resource and so forth are available. A particular example of the admission control is hereinafter described.

The BB processor 222 carries out an error correction coding process for user data and a control signal received from the CNT 221 to convert the user data and the control signal into a baseband signal and outputs the baseband signal after the conversion to the interface 223. Further, the BB processor 222 performs an error correction decoding process and so forth for a baseband signal received from the interface 223 to extract user data and a control signal from the baseband signal and outputs the extracted user data and control signal to the CNT 221.

The interface 223 receives a signal of a given format from the RF unit 210, extracts a baseband signal from the received signal and outputs the extracted baseband signal to the BB processor 222. Further, the interface 223 converts a baseband signal received from the BB processor 222 into a signal of a given format and outputs the signal after the conversion to the RF unit 210.

It is to be noted that, while the example depicted in FIG. 3 includes a single RF unit 210, a plurality of RF units 210 may be provided. Further, the RF unit 210 and the BB unit 220 may be installed at places geographically spaced from each other.

<Example of Configuration of MME, S-GW and P-GW>

Figure 4A:
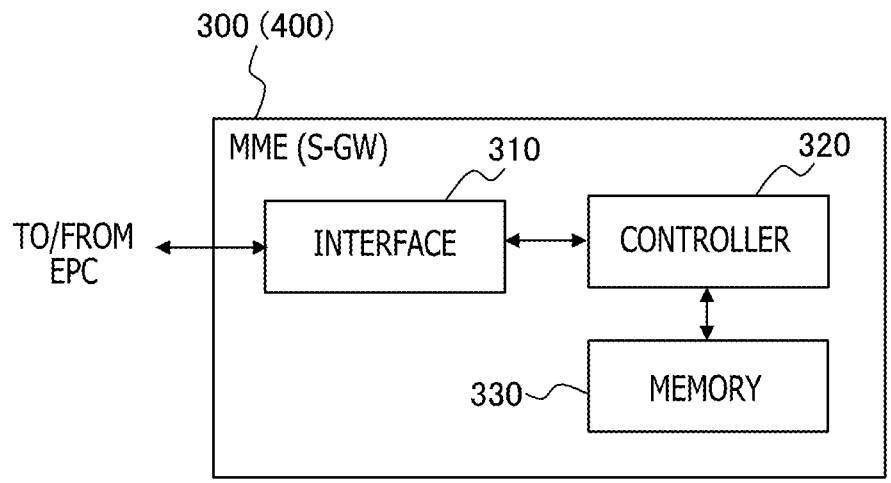
FIG. 4A is a block diagram depicting an example of a mobility management entity (MME) or a serving gateway (S-GW)

FIG. 4A is a view depicting an example of a configuration of an MME. The MME in FIG. 4A may be the MME 300 depicted in FIG. 2. The MME 300 includes an interface 310, a controller 320 and a memory 330.

The interface 310 receives packet data transmitted from the base station 200 or the S-GW 400, extracts a control signal and so forth from the received packet data and outputs the extracted control signal and so forth to the controller 320. Further, the interface 310 receives a control signal and so forth from the controller 320, converts the control signal and so forth into packet data and transmits the packet data after the conversion to the base station 200 and the S-GW 400.

The controller 320 performs position management and authentication management of the terminals 100-1 and 100-2, handover control, establishment and deletion of a bearer between the terminals 100-1 and 100-2 and the P-GW 500, and so forth on the basis of a control signal received from the interface 310. The controller 320 generates a control signal that includes a result of such management and so forth and is to be used for management, and outputs the generated control signal to the interface 310.

The memory 330 stores identification information and position information of the terminals 100-1 and 100-2, route information relating to a bearer and so forth. The controller 320 suitably stores various kinds of information into the memory 330 and performs various processes such as position management.

FIG. 4A depicts an example of a configuration of the S-GW 400. It is to be noted that the individual blocks of the S-GW 400 sometimes have different functions from those described hereinabove. For example, the interface 310 receives packet data transmitted from the base station 200 or the MME 300. The packet data may include user data in addition to a control signal. Further, the controller 320 confirms a destination, a transmission source and so forth of packet data received by the interface 310 and transfers the packet data to a transfer destination. Thereupon, the controller 320 transfers the packet data on the basis of information relating to a bearer exchanged with the MME 300. Further, the information relating to a bearer is stored in the memory 330.

Figure 4B:
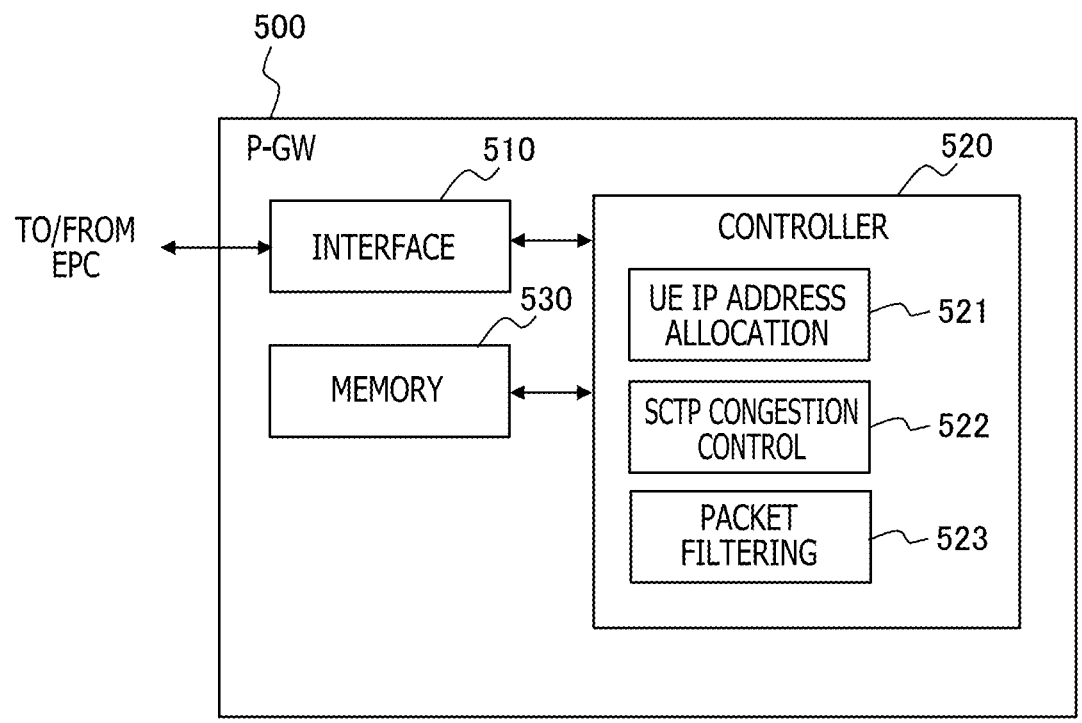
FIG. 4B is a block diagram depicting an example of a packet data network gateway (P-GW)

FIG. 4B is a view depicting an example of a configuration of a P-GW. The P-GW in FIG. 4B may be the P-GW 500 depicted in FIG. 2. The P-GW 500 includes an interface 510, a controller 520, and a memory 530.

The interface 510 receives packet data transmitted from the S-GW 400, extracts user data, a control signal and so forth from the received packet data and outputs the extracted user data and control signal to the controller 520. Further, the interface 510 receives a control signal, user data and so forth from the controller 520, converts the control signal, user data and so forth into packet data and transmits the packet data after the conversion to the S-GW 400 and the host apparatus.

The controller 520 includes a use equipment (UE) IP address allocation unit 521, an SCTP congestion controller 522, and a packet filtering unit 523.

The UE IP address allocation unit 521 allocates an IP address to each of the terminals 100-1 and 100-2. The allocated IP addresses are transmitted to the terminals 100-1 and 100-2 through the interface 510 and so forth.

The SCTP congestion controller 522 receives a notification (or a packet loss duration) from the packet loss estimation unit 225 of the base station 200 and executes SCTP congestion control. The SCTP congestion control is to control the unit of data (sometimes referred to as "chunk") to be transmitted to and received to and from nodes so as to be changed, for example, in response to a congestion state or the level of such congestion of the network. Consequently, control, for example, in response to a congestion state can be performed, and the congestion is minimized and transmit and receive of data packets of a fixed bit rate is secured.

The packet filtering unit 523 receives a notification from the packet loss estimation unit 225 of the base station 200 and performs flow rate control of packet data for each of the terminals 100-1 and 100-2 (or for each user). For example, the packet filtering unit 523 secures the flow rate of packet data of a user in an emergency vehicle or a user who has paid a premium rate on the basis of the notification and restricts the flow rate of packet data to any other user. The flow rate control is such control, for example, as to restrict the data amount of packet data, repeat packet data as it is or control the data amount of packet data.

The SCTP congestion controller 522 or the packet filtering unit 523 may perform policing, shaving and so forth as an example of admission control, for example, by the controller 520. With the admission control, it is possible to secure or restrict the flow rate of packet data for such a given user as described above, for example, by setting a different threshold value or the like to be utilized in the flow rate control.

Each of the policing and the shaving is an example of the admission control, for example, for packet data. According to the policing, for example, if the transmission bit rate of packet data exceeds a given bit rate, then the controller 520 drops the packet data of the exceeding portion. On the other hand, according to the shaving, for example, if the transmission bit rate of packet data exceeds a given bit rate, then the controller 520 stores the packet data of the exceeding portion into the memory 530 and then transmits, when the bit rate thereafter becomes equal to or lower than the given bit rate, the data stored in the memory 530. The controller 520 may monitor the traffic amount or the bit rate of packet data received by the interface 510 and perform such policing or shaving as described above on the basis of a result of the monitoring.

As a particular example of such admission control as described above, the controller 520 may perform different control, for example, in response to an attribute of user data transmitted and received by a data packet or a type of an application (for example, in response to quality of service (QoS)). Where such a process as just described is performed, it is possible to secure, for example, a guaranteed bit rate (GBR).

<Packet Behavior Model>

Figure 12:
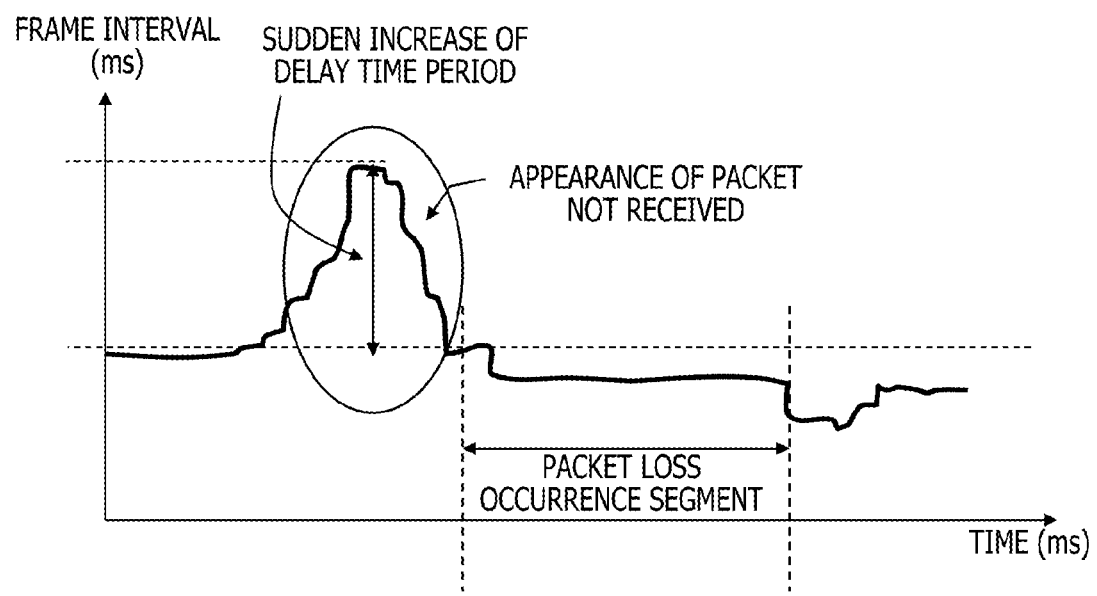
FIG. 12 is a graph illustrating an example of a packet behavior.

FIG. 12 is a graph illustrating an example of a packet behavior. Referring to FIG. 12, the axis of ordinate indicates a frame interval (millisecond) and the axis of abscissa indicates time (millisecond). A "frame" in the frame interval is one or a plurality of packet data transmitted and received, for example, to and from the base station 200 and the S-GW 400 and is sometimes referred to as image frame or the like. A frame including packet data is sometimes referred to, for example, as "frame data."

For example, the following case is considered. In particular, while the base station 200 receives packet data transmitted from the S-GW 400, the transmission source of the packet data is transmitted from the host apparatus. In this case, the host apparatus transmits packet data at regular intervals. Accordingly, also the frame intervals have a fixed length, and also the base station 200 that receives such frames can receive a frame at the regular intervals.

However, congestion in the network or the like may make the frame intervals different from the regular intervals and may make the frame intervals longer than the regular intervals. In such a case, the base station 200 receives packet data after a delay time period elongated from the regular interval.

In the field of communication systems, it has been confirmed from various knowledge in the past that packet loss occurs after such a delay time period of packet data increases. For example, the base station 200 sometimes receives packet data at a point of time delayed from a point of time scheduled initially. In such a case, the delay time period gradually accumulates, and the delay time period becomes longer to packet data transmitted later in time. As a result, the base station 200 fails to receive packet data, which are to be received originally, at the initially scheduled point of time, resulting in occurrence of packet loss. The packet loss signifies that, for example, packet data that are originally to be received by an apparatus on the reception side are lost and are not received by the apparatus.

Figures 6A, 6B:
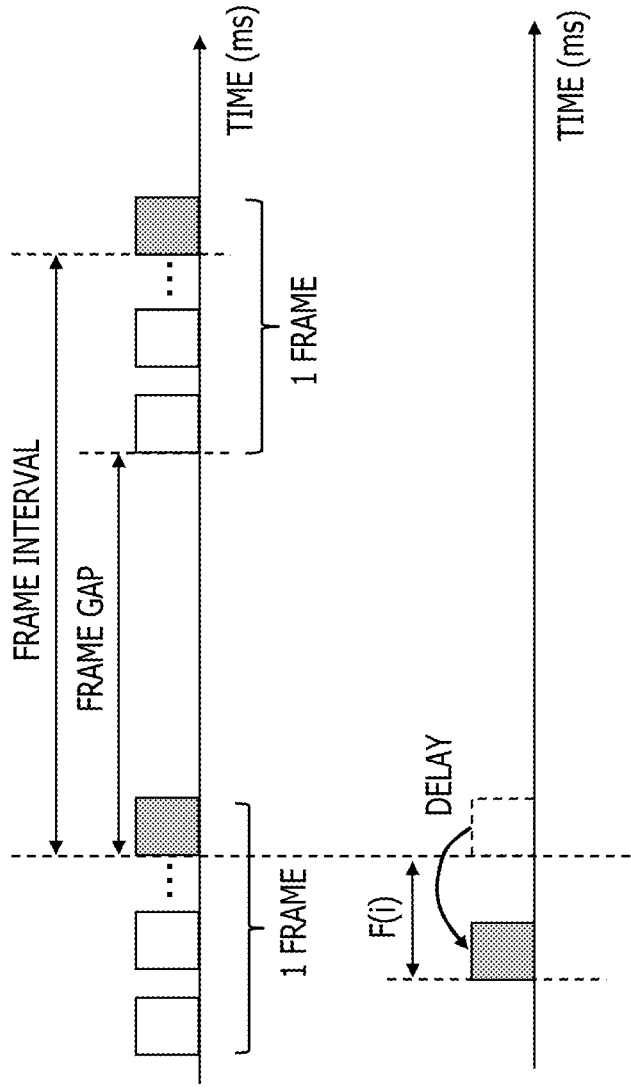
FIGS. 6A and 6B are time charts depicting different examples of a delay time period.

Here, a frame interval is described. FIGS. 6A and 6B depict examples of a frame interval and an increase value F(i) of a delay time period. In a distribution system such as, for example, a digital video transport system (DVTS), packet data are transmitted at regular intervals. It is assumed that, also in the present second embodiment, packet data are transmitted one by one at regular intervals from the host apparatus. In this case, since the number of packet data included in frames is fixed, packet data are transmitted at frame intervals that also are fixed. For example, also packet data at the top of a frame are transmitted at regular intervals, and variation in length of the regular interval is a "delay fluctuation." As the length of the regular interval increases, also the arrival delay time point of the packet data delays from initial arrival time point where the packet data are transmitted at regular intervals.

The base station 200 sometimes receives packet data after a delay from an arrival time point when packet data are transmitted at regular intervals. A reception time of certain packet data when packet data are received at regular intervals (or a reception time when frames are received at regular intervals) is referred to as first reception time. A reception time of packet data received after a time period longer than a regular interval (or a reception time when a frame is received after a time period longer than the regular interval) is referred to as second reception time. An increase value of the delay time period of the second reception time from the first reception time is sometimes referred to, for example, as increase value F(i) of the delay time period.

It is to be noted that, in FIG. 6A, one frame includes 125 packet data, and the interval between packet data at the top of a certain frame (represented by a shadowed square in FIG. 6A) and packet data at the top of the next frame (represented by another shadowed square in FIG. 6A) is a Frame Interval. Further, in FIG. 6B, the increase value of the delay time period is represented by F(i).

Referring back to FIG. 12, the packet behavior illustrated represents that the arrival delay time period of packet data increases suddenly in a certain period of time. Further, FIG. 12 represents that, for example, the base station 200 fails to receive packet data from the S-GW 400 and packet loss occurs continuously for a given period of time due to the sudden increase of the delay time period.

It is known that the relationship between the arrival delay time period of packet data and packet loss has such characteristics as described below:

(1) The increase of the delay time period and the packet loss have a proportional relationship therebetween, and also the packet loss occurrence interval and the packet loss have a proportional relationship therebetween.

(2) The increase of the delay time period and the grace frame number till packet loss have a relationship therebetween.

(3) When the delay time period increases by a great amount, packet loss occurs without placing time.

Figure 5:
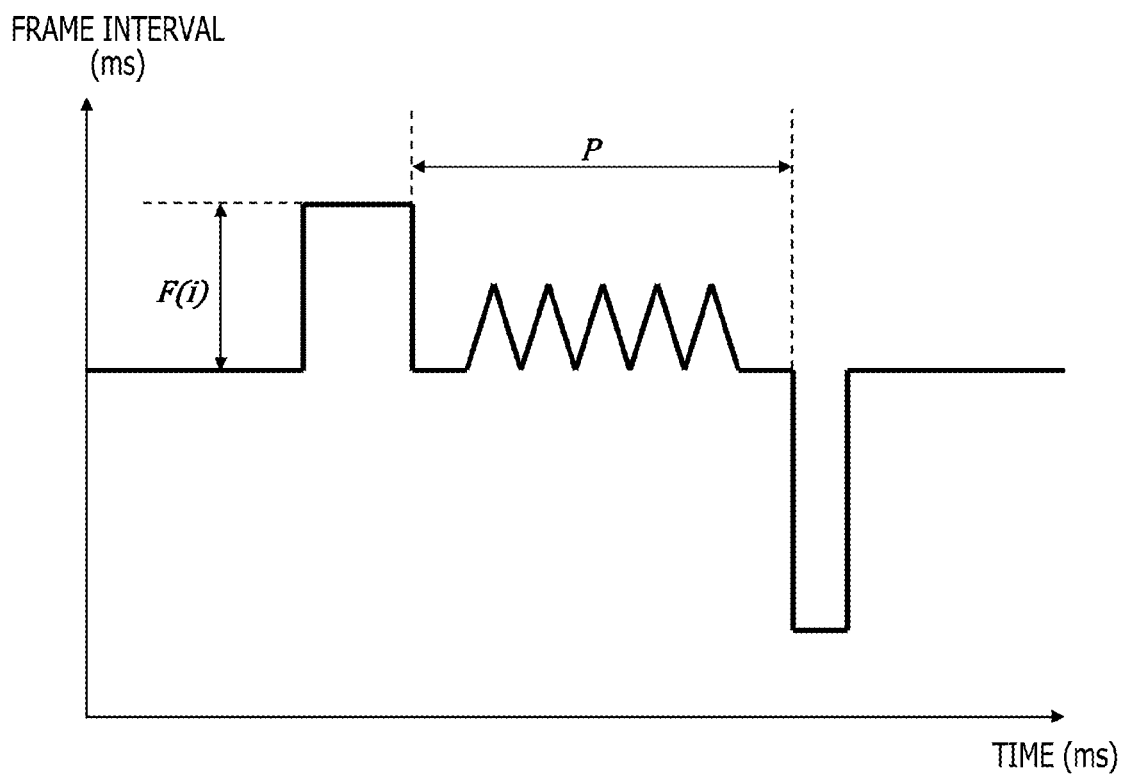
FIG. 5 is a time chart depicting an example of a packet behavior model.

FIG. 5 depicts an example of a packet behavior when it is modeled. Referring to FIG. 5, the axis of ordinate and the axis of abscissa represent the "increase value (millisecond) of the delay time period" and the "elapsed time period (millisecond)," respectively, similarly as in FIG. 12. FIG. 5 generally represents that the arrival time of packet data is delayed and packet loss continues for a given period of time similarly to FIG. 12. It has been found that a packet loss occurrence frame number P and the increase value F(i) of the delay time period have such a relationship as given below from various knowledge and data:

$$P = n \times F(i) + c \qquad \text{[Expression 1]}$$

where c is a constant. In other words, the packet loss occurrence frame number P can be represented by a primary function of the increase value F(i) of the delay time period as represented by the expression (1) above.

In the present second embodiment, attention is paid to the expression 1 above, and the packet loss estimation unit 225 of the base station 200 measures the increase value F(i) of the delay time period to calculate the packet loss occurrence frame number P. The base station 200 determines the calculated packet loss occurrence frame number P as a packet loss occurrence estimated segment. On the basis of the fact that the number of frames transmitted per unit time period is a given value, the packet loss occurrence estimated segment as a time period value can be calculated readily from the packet loss occurrence frame number P.

Then, the base station 200 or the P-GW 500 takes various countermeasures in response to the length of the packet loss occurrence estimated segment P.

<Description of Priority Terminal>

In the present second embodiment, the base station 200 and the P-GW 500 take different countermeasures for a priority terminal and a non-priority terminal. In the following, a priority terminal and a non-priority terminal are described.

Figure 7:
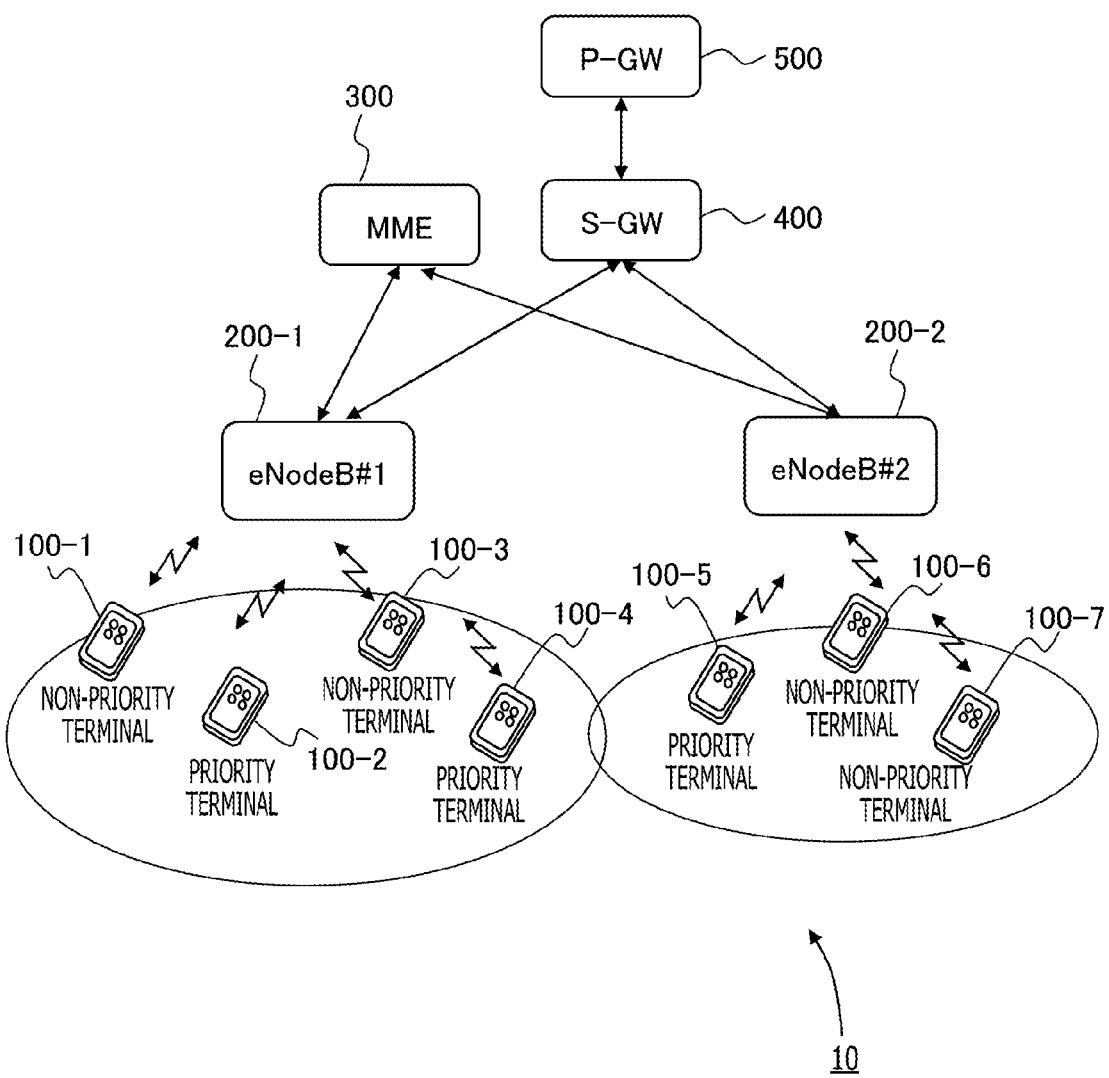
FIG. 7 is a block diagram depicting an example of a configuration of a further communication system.

FIG. 7 depicts an example of a configuration of a communication system which includes a plurality of non-priority terminals and a plurality of priority terminals. The communication system depicted in FIG. 7 may be the communication system 10 depicted in FIG. 2. The non-priority terminals in FIG. 7 are denoted by reference numerals 100-1, 100-3, 100-6, and 100-7, and the priority terminals depicted in FIG. 7 are denoted by reference numerals 100-2, 100-4, and 100-5.

For example, a base station 200-1 allocates radio resources to the priority terminals 100-2 and 100-4 preferentially to the non-priority terminals 100-1 and 100-3 in a service area 200-S1. Consequently, for example, the base station 200-1 can secure radio resources for the priority terminals 100-2 and 100-4 and provide a service to them preferentially to the non-priority terminals 100-1 and 100-3.

In this manner, the base station 200-1 and so forth manage the non-priority terminal 100-1 and the priority terminal 100-2 distinctly from each other. Such management as just described is performed, for example, in the following manner.

In particular, when the terminal 100-1 or 100-2 is to be coupled to the base station 200-1, the base station 200-1 acquires the terminal ID or the user ID from the terminal 100-1 or 100-2. The MME 300, a home subscriber server (HSS) coupled to the MME 300 or the like holds and manages terminal information for each terminal ID and user information for each user ID. The base station 200-1 acquires the terminal information corresponding to the acquired terminal ID from the MME 300 and confirms, on the basis of the terminal information, whether or not the terminal is used in an emergency vehicle or whether or not the user has paid a premium rate (or a terminal used by such a user) and so forth. Then, the base station 200-1 can distinguish on the basis of a result of the confirmation whether the terminal 100-1 or 100-2 is a priority terminal or a non-priority terminal. The base station 200-1 may transmit information of whether the terminal 100 of the terminal ID is a priority terminal or a non-priority terminal to the P-GW 500 together with the terminal ID.

<Example of Motion>

Figure 8:
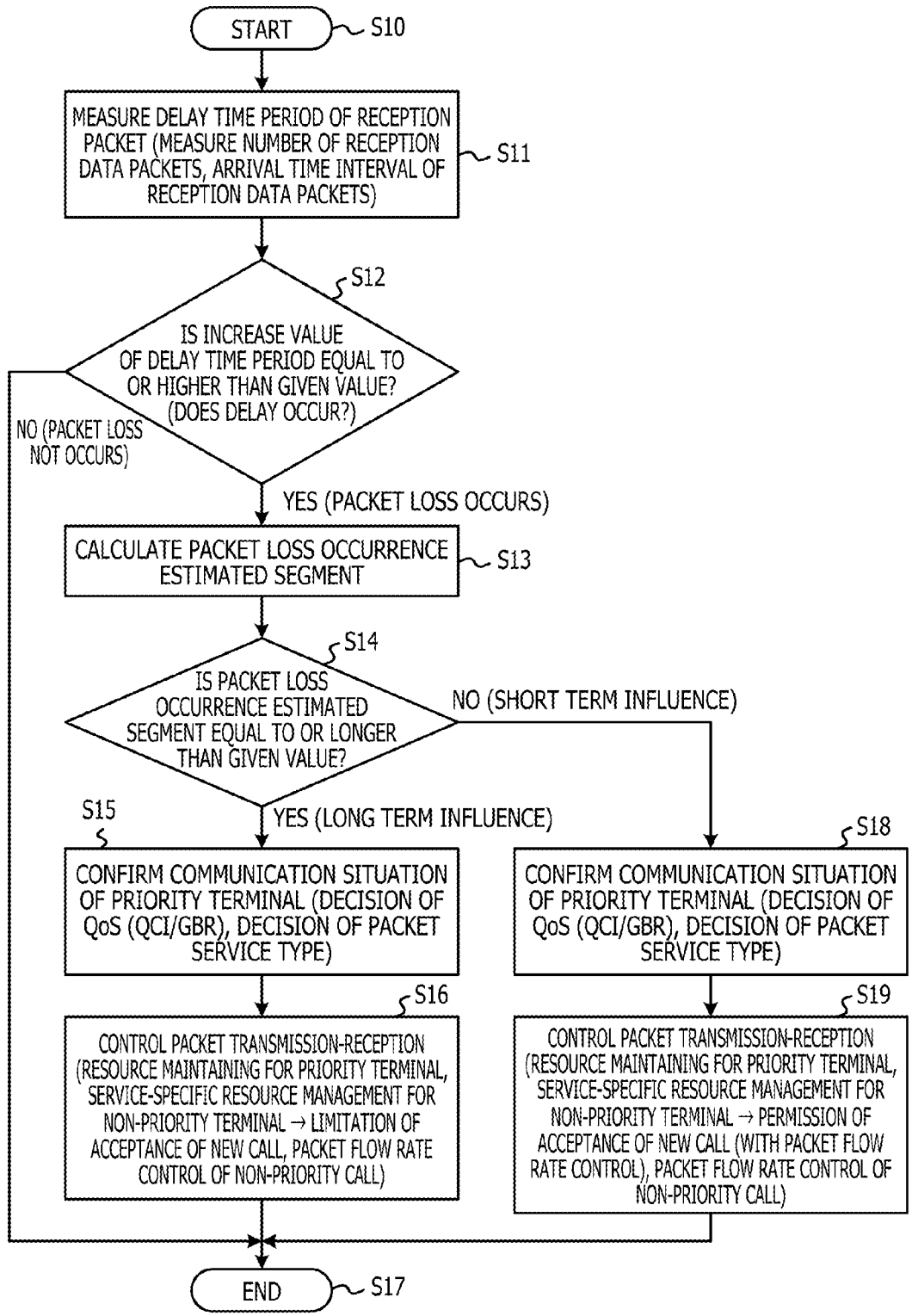
FIG. 8 is a flow chart illustrating an example of a motion.

Now, an example of a motion is described. FIG. 8 is a flow chart illustrating an example of a motion of a base station. The base station depicted in FIG. 8 may be the base station 200 in FIG. 3.

After the base station 200 starts processing (S10), the increase value of the delay time period of a reception packet is measured (S11). The base station 200 measures "F(i)" of the expression 1, for example, by measuring the number of packets of packet data received from the S-GW 400, the arrival time interval of received packet data or the like.

For example, such a process as described below is performed. In particular, the CNT 221 supervises packet data outputted from the BB processor 222 and counts, on the basis of a packet number included in the packet data, a period of time after the packet data of the packet number is received until the packet data of the packet number is received again. The CNT 221 calculates the increase value F(i) of the delay time period on the basis of the count value and the length of the interval when frame data including packet data are transmitted at regular intervals. It is assumed that the length of the regular interval is retained in an internal memory of the CNT 221 or the like.

Then, the base station 200 decides whether or not the increase value of the delay time period of a reception packet is equal to or higher than a given value (S12). For example, the CNT 221 reads out the increase value F(i) of the delay time period and the given value retained in the internal memory or the like and compares the increase value F(i) and the given value with each other to make a decision. Here, the given value is, for example, a value with which occurrence of packet loss is predicted and which is suitably determined on the basis of the history till then.

Then, if the increase value of the delay time period of the reception packet is lower than the given value (No at S12 (the packet loss does not occur)), then the base station 200 ends the processing (S17). In this case, since the increase value of the delay time period of the packet data is lower than the given value, the base station 200 determines that, although delay occurs, the delay amount is not so great that packet loss may occur, and ends the series of processes.

On the other hand, if the increase value of the delay time period of the reception packet is equal to or higher than the given value (Yes at S12 (the packet loss occurs)), then the base station 200 calculates (estimates) a packet loss occurrence estimated segment (S13). In this case, the base station 200 determines that, since the increase value of the delay time period of the packet data is equal to or higher than the given value, packet loss occurs, and calculates a packet loss occurrence estimated segment.

For example, the packet loss estimation unit 225 utilizes the expression 1 to calculate a packet loss occurrence estimated segment. In this instance, it is assumed that the packet loss estimation unit 225 uses $$P=5\times F(i)+100 \quad \text{[Expression 2]}$$

as an example of the expression 1. This expression 2 is an example, and "n" and "c" may have any constants only if "n" and "c" satisfy the expression 1 given hereinabove.

For example, such a process as described below is performed. In particular, the packet loss estimation unit 225 substitutes the increase value F(i) of the delay time period of a reception packet calculated at step S11 into "F(i)" of the expression 2 to calculate (estimate) a packet loss occurrence frame number P. It is assumed that the expression 2 is retained, for example, in the internal memory of the CNT 221 and read out suitably upon the present process.

Then, the base station 200 decides whether or not the packet loss occurrence estimated segment has a value equal to or longer than a given value (S14). The packet loss estimation unit 225 can decide the packet loss occurrence estimated segment, for example, by reading out the calculated packet loss occurrence estimated segment and the given value retained in the internal memory or the like and comparing the calculated packet loss occurrence estimated segment and the given value with each other. Here, since a different countermeasure is taken in response to the length of the packet loss occurrence estimated segment as described above, the present process is performed by the base station 200.

If the packet loss occurrence estimated segment is equal to or longer than the given value (Yes at S14 (the influence ranges over a long period of time)), then the base station 200 confirms a communication situation of the priority terminal 100-2 (S15). In this case, the influence of packet loss occurrence is great and also the restriction of the countermeasure against packet loss is significant in comparison with the influence and the restriction in an alternative case in which the packet loss occurrence estimated segment is lower than the given value.

The present process (S15) is, for example, such as follows. In particular, when the CNT 221 of the base station 200 receives a notification that the packet loss occurrence estimated segment is equal to or longer than the given value from the packet loss estimation unit 225, then the CNT 221 decides the QoS of the priority terminal 100-2 or decides the service type of the packet data. As the QoS decision, for example, the quality class indicator (QCI) is decided for each priority terminal 100-2 and, when the QCI guarantees a bandwidth, the GBR is decided. Such QoS decision may be performed, for example, by the CNT 221. Meanwhile, the decision of the service type of packet data may be performed, for example, by deciding the kind of the service type (audio data by a communication service or the like) included in packet data transmitted and received for each priority terminal 100-2. Also such decision may be performed by the CNT 221. After the CNT 221 confirms a communication situation, the CNT 221 notifies, for example, the P-GW 500 of a result of the confirmation.

Thereafter, the base station 200 or the P-GW 500 performs transmission-reception control of the packet data (S16). As the transmission-reception control (or communication control), for example, the following controls (1) to (5) are available.

(1) In particular, the base station 200 changes the allocation of a radio resource for the direction of downstream communication link (communication link from the base station 200 to the terminal 100). As an example of the change, to the priority terminal 100-2, the base station 200 continues the allocation of a radio resource to hold the radio resource and, to the non-priority terminal 100-1, the base station 200 allocates a radio resource for each service or does not allocate a radio resource. As a type of a service, for example, a communication service by an emergency call, a video distribution service from the host apparatus for which a premium rate is paid and so forth are available. The CNT 221 of the base station 200 may decide a service type on the basis of a service type or a transmission source address included in the received packet data.

(2) The base station 200 may inhibit acceptance of a new call to the terminal 100 in the downstream communication link. For example, even if the CNT 221 of the base station 200 receives packet data destined for a terminal 100 that is not coupled with the base station 200, the CNT 221 may inhibit acceptance of a new call by not performing a process for establishing a coupling with the terminal 100.

(3) The base station 200 controls acceptance of a new call in direction of the upstream communication link (communication link from the terminal 100 to the base station 200). For example, even if a request signal for establishing new coupling is received from a terminal 100, the CNT 221 of the base station 200 does not perform a process for establishing such coupling to perform a process for rejecting acceptance of a new call.

(4) The P-GW 500 performs flow rate control for packet data in the downstream communication link direction. For example, if information of a packet loss occurrence estimated segment, a terminal ID, information of a priority terminal or a non-priority terminal and so forth is received from the base station 200, then the SCTP congestion controller 522 or the packet filtering unit 523 of the P-GW 500 performs congestion control or such a process as to stop transmission for packet data destined for the terminal 100.

(5) The P-GW 500 performs flow rate control for packet data transmitted from the non-priority terminal 100-1 from among packet data in the upstream communication link direction. For example, if information of a packet loss occurrence estimated segment is received from the base station 200, then the SCTP congestion controller 522 and the packet filtering unit 523 perform congestion control or such a process as filtering for packet data whose transmission source is the non-priority terminal 100-1.

The base station 200 ends the series of processes (S17) after performing such a transmission-reception control (S16) as described above.

On the other hand, if the packet loss occurrence estimated segment is not equal to or longer than the given value (No at S14 (the influence is limited within a short period of time)), the base station 200 confirms a communication situation of the priority terminal 100-2 (S18). The confirmation of the communication situation is similar to the confirmation, for example, at step S15.

Then, the base station 200 performs transmission-reception control (or communication control) of packet data (S19). In this case, since the packet loss occurrence estimated segment is shorter than the given value, the base station 200 performs packet transmission-reception control that provides small (or low) restriction in comparison with the packet transmission-reception control in the case where the packet loss occurrence estimated segment is equal to or longer than the given value (S16). In other words, in first communication control when the packet loss occurrence estimated segment is equal to or longer than the given value, the communication restriction to packet data is higher than the communication restriction to packet data in second communication control when the packet loss occurrence estimated segment is shorter than the given value.

In the packet transmission-reception control (S19), although acceptance of a new call is performed, flow rate control for packet data is performed for the new call by the P-GW 500. For example, while, in the controls (2) and (3) described hereinabove, rejection of acceptance of a new call in the downstream communication link direction and the upstream communication link direction is performed, in the present process (S19), the restriction is reduced in comparison with the restrictions in the cases described above. As the process to be performed in the present process (S19), any of the controls (1), (4) and (5) may be performed.

The base station 200 ends the series of processes (S17) after performing the packet transmission-reception control (S19).

The packet transmission-reception control (S16 and S19) described above is an example. The packet transmission-reception control (S16 and S19) may be any countermeasure only if the countermeasure is different depending upon the length of the packet loss occurrence estimated segment. Alternatively, the packet transmission-reception control may be set such that the threshold value for admission control regarding packet data between the P-GW 500 and the terminal 100 is changed, for example, in response to the length of the packet loss occurrence estimated segment. For example, while service-specific resource management is performed for the non-priority terminal 100-1 at step S16 (control (1) described hereinabove), such resource management may not be performed for the non-priority terminal 100-1 while flow rate control of packet data to be exchanged with the non-priority terminal 100-1 may be performed.

<Example of Motion when Emergency Vehicle Moves>

Figure 9:
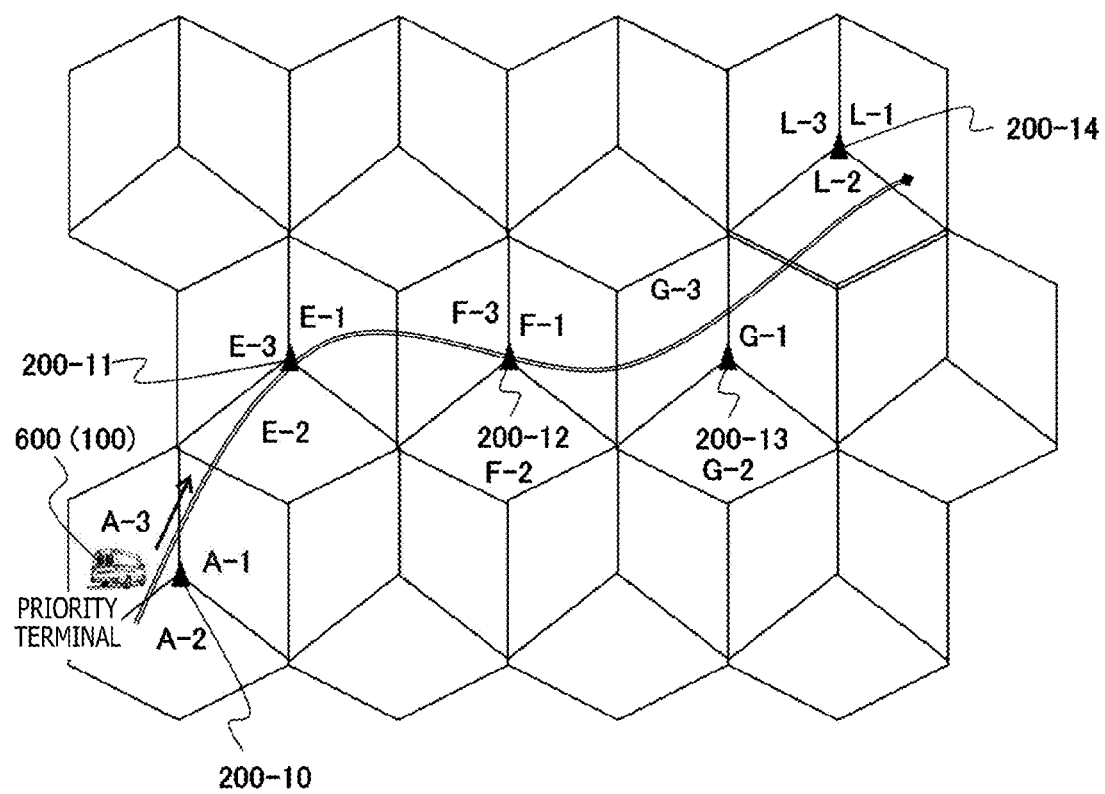
FIG. 9 is a diagrammatic view depicting an example of a movement route.
Figure 10:
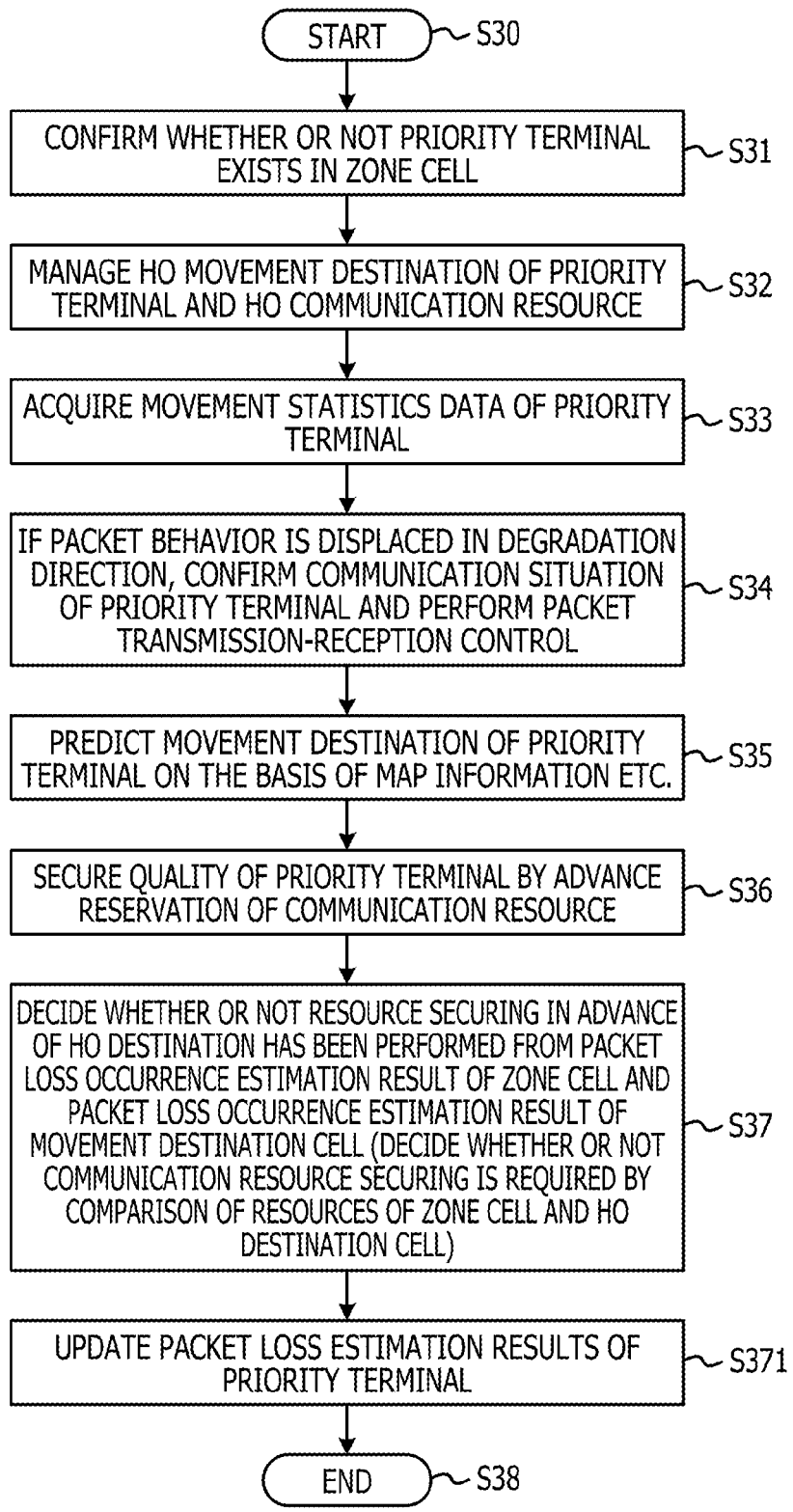
FIG. 10 is a flow chart illustrating an example of a motion when a terminal moves.

Now, an example of a motion when an emergency vehicle 600 moves is described. FIG. 9 depicts an example of a movement route of an emergency vehicle 600, and FIG. 10 is a flow chart illustrating an example of a motion of a base station when an emergency vehicle 600 moves along a movement route. The base station depicted in FIG. 10 may be the base station 200 depicted in FIG. 3.

In FIG. 9, an emergency vehicle 600 moves along a route indicated by a double line curve. Further, the priority terminal 100-2 is mounted in the emergency vehicle 600 and moves together with movement of the emergency vehicle 600. The emergency vehicle 600 is initially positioned in a cell (or sector; hereinafter referred to sometimes as "cell") A-3 under the control of a base station 200-10. Then, the emergency vehicle 600 moves from the cell A-3 to a cell E-2 of a base station 200-11 via a cell A-1. Further, the emergency vehicle 600 moves from the cell E-2 via a cell E-1 and so forth and finally to comes a cell L-1. Together with the movement of the emergency vehicle 700, also the priority terminal 100-2 moves successively passing cells A-2, A-3, A-1, E-2, E-1, F-3, F-1, G-3, G-1, L-2 and L-1.

It is to be noted that, in FIG. 9, rectangles represent base stations 200-10 to 200-14.

An example of a motion when the priority terminal 100-2 moves (or hands over) from the cell A-3 to the cell A-1 is described with reference to FIG. 10.

After the base station 200-10 starts processing (S30), it confirms whether or not the priority terminal 100-2 exists in a zone cell (S31). For example, the CNT 221 of the base station 200-10 performs the confirmation depending upon whether or not a process for establishing a coupling with the priority terminal 100-2 has been performed. In this case, the CNT 221 may perform the confirmation on the basis of the terminal ID, telephone number or the like of the priority terminal 100-2.

Then, the base station 200-10 manages the movement (or handover) destination of the priority terminal 100-2 and a radio resource involved in the movement (S32). For example, the CNT 221 of the base station 200-10 determines, on the basis of quality information received from the priority terminal 100-2, for example, on the basis of a channel quality indicator (CQI), movement destination of the priority terminal 100-2 and secures a radio resource for the priority terminal 100-2.

Then, the base station 200-10 acquires movement statistics data of the priority terminal 100-2 (S33). The present process corresponds to the processes, for example, from steps S12 to S14 of FIG. 8. The base station 200-10 measures the delay time period of reception packet data destined for the priority terminal 100-2 to calculate the increase value F(i) of the delay time period and calculates a packet loss occurrence estimated segment P on the basis of the increase value F(i) of the delay time period (S12 and S13).

Then, if the packet behavior is displaced in a degradation direction, then the base station 200-10 confirms the communication situation of the priority terminal 100-2 and performs packet transmission-reception control (S34). The present process corresponds, for example, to the processes at steps S15 and S16 of FIG. 8 when the decision at step S14 is Yes. When the packet loss occurrence frame number P is equal to or longer than a given value, the base station 200-10 estimates that the influence of packet loss continues for a given period of time or more and performs packet transmission-reception control accordingly.

Then, the base station 200-10 predicts a destination of movement of the priority terminal 100-2 on the basis of map information (S35).

The prediction is performed, for example, in the following manner. In particular, a GPS sensor, an acceleration sensor or the like in the priority terminal 100-2 measures and transmits the current position, moving speed, time and so forth of the priority terminal 100-2 to the base station 200-10. When the information is received, the CNT 221 of the base station 200-10 compares the information with the map information, cell disposition information and so forth retained in the internal memory or the like to estimate the position of the priority terminal 100-2 after a given interval of time on the basis of the current position, moving speed, time and so forth. In the example of FIG. 9, the base station 200-10 estimates that the priority terminal 100-2 moves to the cell A-3 after the given time interval.

Referring back to FIG. 10, the base station 200-10 subsequently secures the quality of the priority terminal 100-2 by advance reservation of a communication resource (S36). For example, the CNT 221 of the base station 200-10 secures a radio resource for the priority terminal 100-2 also in the cell A-3 of the predicted moving destination preferentially to a non-priority terminal. Thereafter, the priority terminal 100-2 moves from the cell A-3 to the cell A-1.

Then, the base station 200-10 decides, from the two results of packet loss occurrence estimation of the zone cell and the movement destination cell, whether or not radio resource securing in advance of the handover destination has been performed (S37).

For example, the packet loss estimation unit 225 of the base station 200-10 performs such processes as described below. In particular, the packet loss estimation unit 225 retains, in a memory or the like, a packet loss occurrence estimated segment P1 for the priority terminal 100-2 in the cell A-3 before the handover (before the movement). Further, the packet loss estimation unit 225 calculates a packet loss occurrence estimated segment P2 in the cell A-1 after the handover (after the movement). The packet loss estimation unit 225 compares the two packet loss occurrence estimated segments P1 and P2 with each other to decide whether or not securing of a radio resource for the priority terminal 100-2 has been performed. The decision may be performed by the CNT 221, for example, in response to a difference in time length between the packet loss occurrence estimated segments P1 and P2. The CNT 221 may, for example, use the secured radio resource as it is, release the secured radio resource, or secure a radio resource that is smaller or greater than the secured radio resource, in response to the difference.

Then, the base station 200-10 that manages a movement destination cell continuously acquires statistics data of the priority terminal 100-2 and updates the packet loss estimation results of the zone cell and the movement destination cell for every handover (S371). For example, if the priority terminal 100-2 hands over from the cell A-3 to the cell A-1, then the CNT 221 of the base station 200-10 retains the packet loss estimation results in the cell A-3 and the packet loss estimation results in the cell A-1 into the internal memory or the like. Every time the priority terminal 100-2 hands over, the packet loss estimation results in the associated cells are successively retained into the internal memory.

Then, the base station 200-10 ends the sequence of processes (S38).

The example described above is an example in the case wherein the priority terminal 100-2 moves from the cell A-3 to the cell A-1. For example, also when the priority terminal 100-2 moves from the cell A-1 to the cell E-2, similar processes to processes in the example described hereinabove can be performed. Also in this case, the base station 200-10 may perform the processes at steps S30 to S38. Also when the priority terminal 100-2 moves from the cell E-2 to the cell E-1, the base station 200-11 can execute processing by performing the processes at steps S30 to S38. The base stations 200-11 to 200-14 can perform estimation of a packet loss occurrence estimated segment in accordance with movement of the priority terminal 100-2 and perform a countermeasure against packet loss together with the P-GW 500 by performing the processes at steps S30 to S38.

In this manner, in the second embodiment, the base station 200 predicts an occurrence estimated segment of packet loss on the basis of the increase value F(i) of the delay time period of an arrival time point of packet data transmitted and received to and from the S-GW 400. Since the base station 200 predicts a packet loss occurrence estimated segment, it is possible for the base station 200 or the P-GW 500 to perform various countermeasures in comparison with an alternative case in which it is estimated whether or not packet loss occurs. Although a countermeasure different depending, for example, upon whether or not the packet loss occurrence estimated segment is longer than a given value can be performed (for example, S16 and S19 of FIG. 8), various countermeasures against packet loss may not be able to be performed in some cases depending only upon whether or not packet loss occurs. The communication system 10 can carry out an optimum countermeasure against packet loss by performing such countermeasures as described above. Thus, communication quality higher than a fixed level can be secured by an optimum countermeasure.

Other Embodiments

Figure 11:
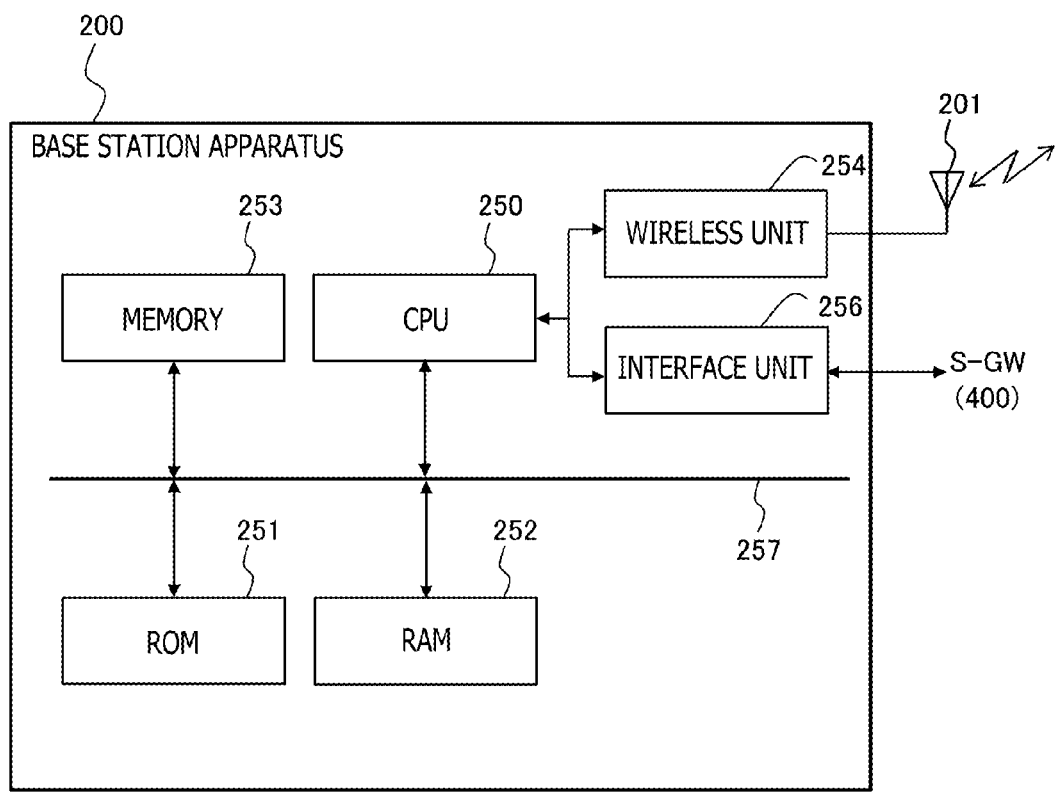
FIG. 11 is a block diagram depicting an example of a configuration of hardware of a base station apparatus.

FIG. 11 depicts an example of a hardware configuration of a base station. The base station depicted in FIG. 11 may be the base station 200 depicted in FIG. 3. The base station 200 includes a central processing unit (CPU) 250, a read-only memory (ROM) 251, a random access memory (RAM) 252, a memory 253, a wireless unit 254, an antenna 255, and an interface 256. The CPU 250 and the ROM 251, RAM 252 and memory 253 are coupled to each other through an internal bus 257.

The CPU 250 reads out a program from the ROM 251 and loads the program into the RAM 252 and then executes the loaded program to execute functions, for example, of the BB processor 222, CNT 221 and interface 223. The CPU 250 corresponds, for example, to the BB processor 222, CNT 221 and interface 223 in the second embodiment.

Further, the wireless unit 254 corresponds, for example, to the RF unit 210 in the second embodiment.

The interface 256 converts data, a control signal and so forth outputted from the CPU 250 into packet data of a format that can be transmitted to the S-GW 400 and outputs the packet data. Further, the interface 256 receives packet data transmitted from the S-GW 400, extracts data, a control signal and so forth from the packet data and outputs the extracted data and so forth to the CPU 250. The interface 256 corresponds, for example, to the CNT 221 in the second embodiment.

Although the example of FIG. 11 described hereinabove includes the CPU 250, a controller other than the CPU 250 such as a micro processing unit (MPU) or a field programmable gate array (FPGA) may be used in place of the CPU 250.

The embodiments described above are directed to an example in which the packet loss estimation unit 225 is provided in the base station 200. However, the packet loss estimation unit 225 may be provided otherwise, for example, in a communication apparatus that repeats image frame data such as the S-GW 400 or the P-GW 500. In this case, the S-GW 400 or the P-GW 500 may estimate a packet loss occurrence estimated segment and cause the base station 200 or the P-GW 500 to perform management of a radio resource or perform flow rate control of packet data.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication apparatus that relays a plurality of image frame data, each of which includes at least one packet, between a host apparatus and a terminal apparatus, the communication apparatus comprising:
  a memory; and
  a processor coupled to the memory and configured to
    receive the plurality of image frame data transmitted at a transmission intervals from the host apparatus,
    measures a reception interval between the plurality of image frame data, and
    estimate, based on a difference value between the reception interval and the transmission interval, a reception time range within which packet loss occurs in the received plurality of image frame data.

2. The communication apparatus according to claim 1, wherein the processor is configured to change, based on the estimated reception time range, a threshold value for restricting a data amount of the packets to be transmitted to the terminal apparatus.

3. The communication apparatus according to claim 1, wherein the processor is configured to control, based on the estimated reception time range, a data amount of the packets to be communicated between the communication apparatus and the terminal apparatus.

4. The communication apparatus according to claim 3, wherein
the processor is configured to perform first communication control when the reception time range is equal to or greater than a given time period and perform second communication control when the reception time range is smaller than the given time period, and
the first communication control has a first communication restriction for the packet and second communication control has a second communication control for the packet, the first communication control is severe than the second communication control.

5. The communication apparatus according to claim 1, wherein the processor is configured to notify a gateway apparatus managing the packets of the reception time range.

6. The communication apparatus according to claim 5, wherein the processor is configured to cause the gateway apparatus to perform control of a data amount of the packets to be communicated by the gateway apparatus by transmitting the reception time range to the gateway apparatus.

7. The communication apparatus according to claim 1, wherein the reception time range is represented by a primary function of an increase amount of the difference value between the reception interval and the transmission interval.

8. The communication apparatus according to claim 1, wherein, where the reception time range is represented by P and an increase amount of the difference value between the reception interval and the transmission interval is represented by F, the reception time range P is represented by $$P = n \times F + c$$

where n and c are constants.

9. An estimation method using a communication apparatus that relays a plurality of image frame data, each of which includes at least one packet, between a host apparatus and a terminal apparatus, the method comprising:
receiving the plurality of image frame data transmitted at a transmission interval from the host apparatus;
measuring a reception interval between the plurality of image frame data; and
estimating, based on a difference value between the reception interval and the transmission interval, a reception time range within which packet loss occurs in the received plurality of image frame data.

10. The estimation method according to claim 9, further comprising:
changing, based on the estimated reception time range, a threshold value for restricting a data amount of the packets to be transmitted to the terminal apparatus.

11. The estimation method according to claim 9, further comprising:
controlling, based on the estimated reception time range, a data amount of the packets to be communicated between the communication apparatus and the terminal apparatus.

12. The estimation method according to claim 11, further comprising:
performing first communication control when the reception time range is equal to or greater than a given time period and performing second communication control when the reception time range is smaller than the given time period, wherein
the first communication control has a first communication restriction for the packet and second communication control has a second communication control for the packet, the first communication control is severe than the second communication control.

13. The estimation method according to claim 9, further comprising:
notifying a gateway apparatus managing the packets of the reception time range.

14. The estimation method according to claim 13, further comprising:
causing the gateway apparatus to perform control of a data amount of the packets to be communicated by the gateway apparatus by transmitting the reception time range to the gateway apparatus.

15. The estimation method according to claim 9, wherein the reception time range is represented by a primary function of an increase amount of the difference value between the reception interval and the transmission interval.

16. The estimation method according to claim 9, wherein the reception time range is represented by P and an increase amount of the difference value between the reception interval and the transmission interval is represented by F, the reception time range P is represented by $$P = n \times F + c$$

where n and c are constants.

* * * * *